United States Patent
Blick et al.

(10) Patent No.: US 12,358,213 B2
(45) Date of Patent: Jul. 15, 2025

(54) STEP-WISE FORMATION OF A THREE-DIMENSIONAL STRUCTURE EMPLOYING DIFFERENT RESOLUTIONS

(71) Applicant: UNIVERSITÄT HAMBURG, Hamburg (DE)

(72) Inventors: Robert Blick, Hamburg (DE); Stefanie Haugg, Hamburg (DE); Robert Zierold, Hamburg (DE)

(73) Assignee: UNIVERSITÄT HAMBURG, Hamburg (DE)

( * ) Notice: Subject to any disclaimer, the term of this patent is extended or adjusted under 35 U.S.C. 154(b) by 306 days.

(21) Appl. No.: 17/916,160

(22) PCT Filed: Mar. 30, 2021

(86) PCT No.: PCT/EP2021/058276
§ 371 (c)(1),
(2) Date: Sep. 30, 2022

(87) PCT Pub. No.: WO2021/198246
PCT Pub. Date: Oct. 7, 2021

(65) Prior Publication Data
US 2023/0191691 A1 Jun. 22, 2023

(30) Foreign Application Priority Data
Mar. 31, 2020 (LU) .................................. LU101722

(51) Int. Cl.
*B29C 64/135* (2017.01)
*B29C 64/176* (2017.01)
*B29C 64/264* (2017.01)
*B29C 64/393* (2017.01)
*B33Y 10/00* (2015.01)
*B33Y 50/02* (2015.01)

(52) U.S. Cl.
CPC .......... *B29C 64/135* (2017.08); *B29C 64/176* (2017.08); *B29C 64/264* (2017.08); *B29C 64/393* (2017.08); *B33Y 10/00* (2014.12); *B33Y 50/02* (2014.12)

(58) Field of Classification Search
CPC ... B29C 64/176; B29C 64/264; B29C 64/135; B29C 64/393; B33Y 50/02; B33Y 10/00
See application file for complete search history.

(56) References Cited

U.S. PATENT DOCUMENTS

2015/0223739 A1* 8/2015 Walavalkar ....... H01L 27/14698
356/301

FOREIGN PATENT DOCUMENTS

FR 3 056 593 A1 3/2018
WO 2009/075970 A1 6/2009

* cited by examiner

*Primary Examiner* — Monica A Huson
(74) *Attorney, Agent, or Firm* — Seed IP Law Group LLP

(57) ABSTRACT

A method of step-wise exposing a voxel of a resist to radiation for forming a three-dimensional structure, the method comprising setting a step size to a first resolution; setting a voxel volume to a first volume; exposing a first set of voxels of said first volume to radiation using said first resolution; setting the step size to a second resolution being smaller than said first resolution, or, respectively, greater than said first resolution; setting the voxel volume to a second volume being smaller than said first volume, or, respectively, greater than said first volume; and exposing a second set of voxels of said second volume to radiation using said second resolution.

12 Claims, 2 Drawing Sheets

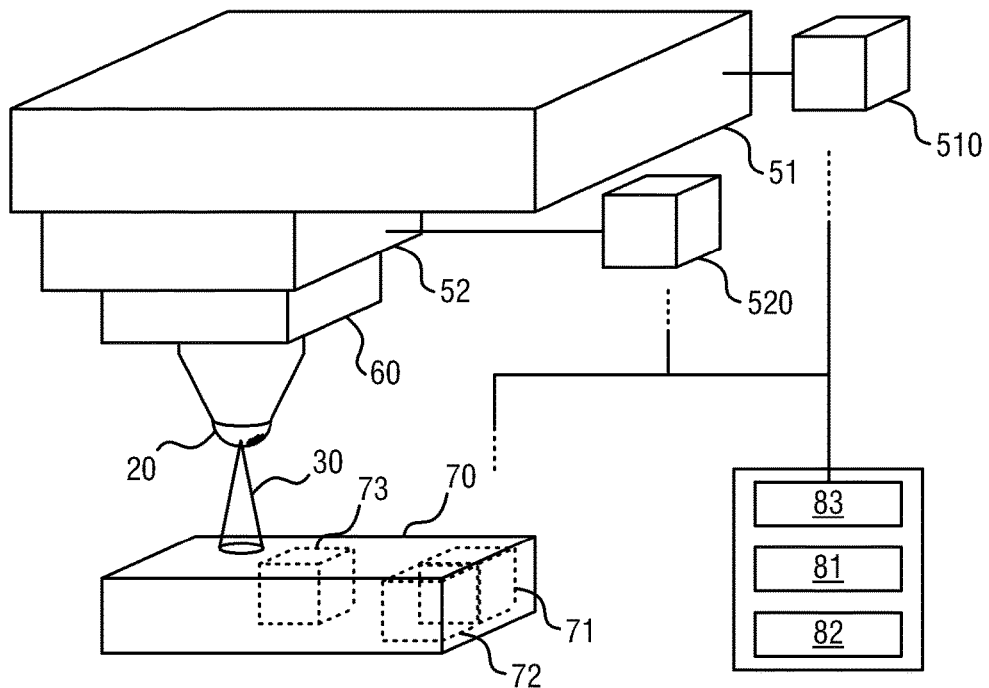
Fig. 4B
Fig. 4A
Fig. 5A
Fig. 5B
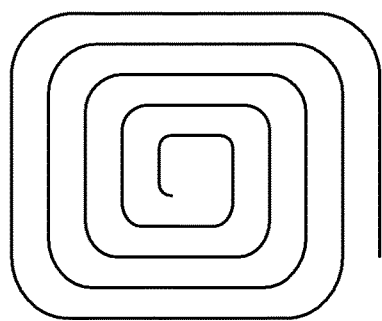
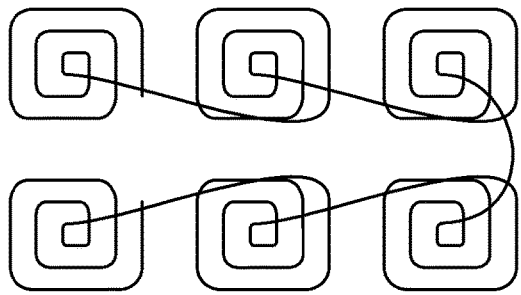

STEP-WISE FORMATION OF A THREE-DIMENSIONAL STRUCTURE EMPLOYING DIFFERENT RESOLUTIONS

TECHNICAL FIELD

The present invention relates to techniques for forming three-dimensional structures by exposing a resist to radiation, in the sense of three-dimensional printing (3DP). More particularly, the present invention relates to three-dimensional printing at smaller scales where the feature size is at a sub-micron scale, i.e. where the feature-size can be smaller than 1 μm or even smaller than 100 nm. This technology may also be referred to as three-dimensional printing on the nanoscale or 3D-nanoprinting (3DN).

TECHNICAL BACKGROUND

The last decade has witnessed the beginning of the application of three-dimensional (3D) printing on the nanoscale. This has led to a large number of novel findings and applications in a broad range of fields starting with microfluidics over to integrated optics and to biophysical applications. Similar to the macro- and meso-scale, 3D-nanoprinting (3DN) is currently revolutionizing many industrial fabrication processes. The basis for the 3DN technology was defined by the development of direct laser writing (DLW) tools for lithography in 2D and 2.5D. These tools are mostly used for generating masks for classical 2D optical lithography, but are also employed for sculpting optical micro-lenses for displays with a 2.5D-relief. Recently 3D-printing also was applied to the nanoscale.

An important technical advance was achieved by the application of a quantum mechanical process called two-photon (2P) absorption. This 2P-process is much less likely than the conventional absorption of energy by a material—such as a resist—in a classical exposure process, such as normal photolithography. In order to enhance the likeliness of 2P-processes to occur, one needs to enhance the intensity and the energy of the radiation delivered. With the help of optical lenses with aperture and the development of femtosecond lasers it is now possible to make use of two-photon-polymerization, i.e. a 2P-process which polymerizes a resist only when two photons of the same energy are available.

A conventional procedure includes usually first the placing of a resist on a support structure, into which the 3D-geometry is then written in a sequential fashion. During exposure, the most important parameters can be identified in the focus spot size, the writing speed, and the absolute sample size. Finally, it may be important to ensure that the exposed structure maintains its mechanical rigidity during the subsequent development and rinsing processes. It turns out that the last step of delivering the target structure from the resist is usually not trivial, and factors such as how the surface tension and embedded strain interact on the nano- to micro-meter scale. Consequently, 3DN-structures may require a set of special design rules for the target structure having sub-micron features, but having at the same time the necessary mechanical rigidity.

For the above-mentioned reasons, three-dimensional structures with sub-micron features usually require support structures that easily exceed the dimensions of several hundreds of micrometers. Further, there are also target-structures which for themselves possess smaller features, e.g. at the sub-micron scale, and—at the same time—features at a much larger scale that range into the mesoscopic scale. Since, however, the different scale dimensions coexist in one structure, the conventional approaches consider the formation of the target-structure in one procedure. The conventional arts consider the formation of the larger structures with the same means as are employed for forming the smaller structures, including those at the sub-micron scale. As a result, the necessary exposure and processing times are disadvantageously long, which—in turn—substantially impede the application of 3DN for high-yield industrial applications, where only a sufficiently high component yield may justify the involved investments. This is similar to the field of modern semiconductor device manufacturing, where only the high degree of scalability and reproducibility allows the manufacturing of powerful devices at a mass-production scale at reasonable costs for the consumers.

There is therefore a need for an improved way of step-wise forming three-dimensional structures at smaller scales that substantially shortens process and exposure times so as to improve yield and allow for device production at larger scales.

SUMMARY

The mentioned problems and drawbacks are addressed by the subject matter of the independent claims. Further preferred embodiments are defined in the dependent claims.

According to one aspect of the present invention there is provided a method of step-wise exposing a voxel of a resist to radiation for forming a three-dimensional structure, the method comprising setting a step size to a first resolution; setting a voxel volume to a first volume; exposing a first set of voxels of said first volume to radiation using said first resolution; setting the step size to a second resolution being smaller than said first resolution, or, respectively, greater than said first resolution; setting the voxel volume to a second volume being smaller than said first volume, or, respectively, greater than said first volume; and exposing a second set of voxels of said second volume to radiation using said second resolution.

BRIEF DESCRIPTION OF THE DRAWINGS

Embodiments of the present invention, which are presented for better understanding the inventive concepts but which are not to be seen as limiting the invention, will now be described with reference to the figures in which:

FIGS. 4A and 4B shows schematic views of general device and apparatus embodiments of the present invention; and FIGS. 5A & 5B show schematic views of a writing path arrangement according to respective embodiments of the present invention.

DETAILED DESCRIPTION

In the context of the present disclosure, three-dimensional printing at the nano meter scale may involve the step-wise exposing of nano-scale volumes (so-called voxels) of a photoresist to focused pulsed infrared radiation. Depending on the absorbed light, there is no polymerization, useful or target polymerization, and, respectively, blistering of the photoresist. The non-polymerized voxels are removed during developing, whereas the polymerized voxels remain to form the 3DN printed structure. At larger scales, correspondingly larger volumes are step-wise exposed to infrared radiation being focussed to the larger target volumes.

Figure 1A:
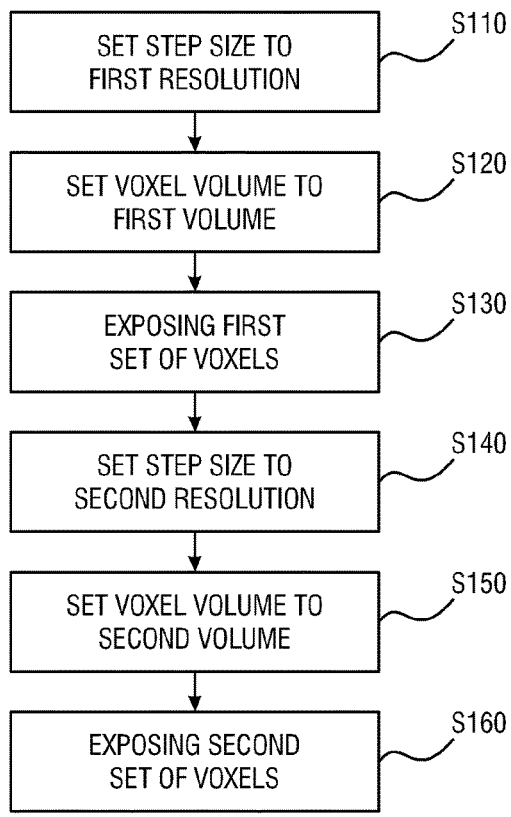
FIGS. 1A and 1B shows schematic flow chart views of general method embodiments of the present invention.

FIG. 1A shows a schematic flow chart view of a general method embodiment of the present invention. This embodiment considers the step-wise exposure of voxels of a resist to radiation for forming a three-dimensional structure. According to this embodiment, the method comprises at least one instance of changing the resolution, involving any one of changing the voxel volume, changing a step-size in any one of three dimensions, changing a focal point volume in which the light intensity fulfils an intensity requirement, changing an optical path of radiation from a radiation source to the focal point volume, changing an emission power of the radiation source, and changing wavelength characteristics of the radiation source. The term 'changing' includes both changing from a smaller resolution to a higher resolution and changing from a higher resolution to a smaller resolution. A relatively small resolution may imply a relatively large voxel volume, a relatively large focal point volume, a relatively large step-size, and/or a relatively high radiation source power, whereas a relatively high resolution may imply a relatively small voxel volume, a relatively small focal point volume, a relatively small step-size, and/or a relatively small radiation source power.

Specifically and as shown in FIG. 1A, the general method embodiment of the present invention comprises a step S110 of setting a step size to a first resolution and a step S120 of setting a voxel volume to a first volume, wherein the mentioned order can be generally reversed or also steps S110 and S120 can be performed in part or substantially at the same time. In one embodiment, the first resolution is relatively high and the corresponding first step size of the first resolution may be in a range of 100 nm to 300 nm, and the first volume of said voxel volume may be in a range of 10,000 $nm^3$ to $2.7 \times 10^7$ $nm^3$. For this relatively high resolution, a first drive mechanism may be employed for moving and positioning an amount of resist relative to the radiation source or the focal point of that source. This high-resolution drive may be a piezo drive, a galvo drive, or a combination there of. However, in another embodiment the method begins with a relatively low resolution. Generally, the terms first resolution and second resolution are not to be seen as limiting with respect to an absolute timely order or type of resolution, i.e. high or low resolution.

If necessary, also other parameters may be chosen and set, such as setting a radiation power to a first power before exposing the first set of voxels, wherein the first power is suitable for exposing voxels at the first resolution which includes the sufficient exposure to radiation energy within the resist so that a target fraction of or substantially the entire target volume of the resist can make a transition from a liquid, viscous, or soluble state to a solid, hardened or non-soluble state. Further, also an optical path of said radiation may be changed, which may include inserting or removing of an optical component into or from the optical path.

The general method embodiment then includes a step S130 of exposing a first set of voxels of said first volume to radiation using said first resolution. In this step, one or more voxels of the first volume are exposed to radiation so as to form a corresponding number of solid, hardened or non-soluble elements of the target structure. This step may involve the driving of the drive selected for this resolution. In particular, a possible sub-sequence may include any one of turning off an exposure of resist to radiation, determining a position, generating drive signals to change the positioning of the resist relative to the focal point of the radiation, turning on an exposure of resist to radiation.

The general method embodiment then includes at least one change of resolution in that in step S140 the step size is set to a second resolution being smaller than said first resolution, or, respectively, greater than said first resolution, and in step S150 the voxel volume is set to a second volume being smaller than said first volume, or, respectively, greater than said first volume. In other words, if the resolution is changed from a high resolution to a low resolution, the step size is set to a second resolution being greater than said first resolution, and the voxel volume is set to a second volume being greater than said first volume. If, however, the resolution is changed from a low resolution to a high resolution, the step size is set to a second resolution being smaller than said first resolution, and the voxel volume is set to a second volume being smaller than said first volume If necessary, also other parameters may be chosen and set, such as setting a radiation power or laser pulse duration to a second power before exposing the second set of voxels, wherein the second power is suitable for exposing voxels at the second resolution which includes the sufficient exposure to radiation energy within the resist so that a target fraction of or substantially the entire target volume of the resist can make a transition from a liquid, viscous, or soluble state to a solid, hardened or non-soluble state. Further, also an optical path of said radiation may be changed, which may include inserting or removing of an optical component into or from the optical path.

In step S160 a second set of voxels of a second volume is exposed to radiation using said second resolution. In an embodiment the second resolution is relatively low and the corresponding second step size of the second resolution may be in a range of 500 nm to 5 µm, and the second volume of said voxel volume is in a range of 0.125 $\mu m^3$ to 125 $\mu m^3$. For this relatively low resolution, a second drive mechanism may be employed for moving and positioning an amount of resist relative to the radiation source or the focal point of that source. This low-resolution drive may be a piezo drive or a step motor drive.

Figure 1B:
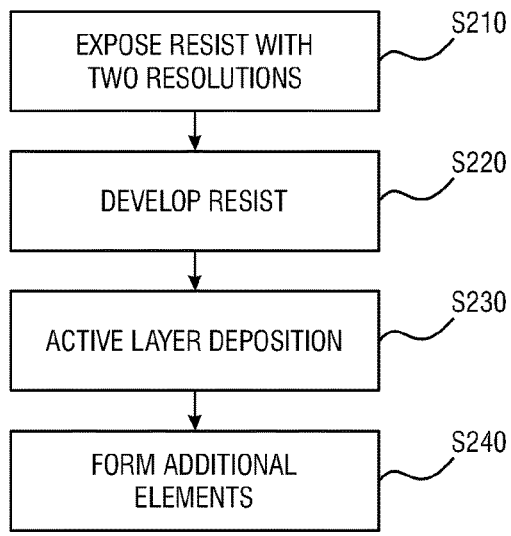

FIG. 1B shows a schematic flow chart view of a further method embodiment of the present invention. Specifically, this embodiment is—in an exemplary embodiment—for manufacturing a microchannel sensor as described in greater detail elsewhere in the present disclosure. In a first step, or group of steps, S210 a target structure in the exemplary form of a microchannel sensor substrate is formed by means of exposing a resist with at least two resolutions. This can include at least in part, the entire, or even more than one iteration of the steps as described in conjunction with FIG. 1A. In an embodiment, the sets of channels are formed by employing a relatively high resolution, whereas support and/or intermediate structures are formed by employing a relatively low resolution.

In a subsequent step S220, the exposed resist is developed, so as to obtain the sensor substrate without non-exposed resist or other undesired residual components. In a step S230, an active layer is formed on the inner surface of the hollow channels. This may involve the already mentioned atomic layer deposition (ALD). In a step S240, the top and bottom electrodes are formed and possibly also contacted to a sensor support/chassis, which may include evaporation of one or more electrode material (e.g. a metal such as gold, aluminum, etc.) and may additionally consider evaporation under an angle.

Figure 2A:
FIGS. 2A to 2D show schematically the formation of a three-dimensional target structure starting from an amount of resist according to an embodiment of the present invention.

FIGS. 2A to 2D show schematically the formation of a three-dimensional target structure starting from an amount of resist according to an embodiment of the present invention. In this embodiment, the process starts with an amount 40 of a suitable resist residing on a support as shown in FIG. 2A. Although it is shown a droplet 40 of resist on a planar substrate, there may be other configurations, arrangements and orientations. For example, also a configuration may be employed in which a droplet of resist is held from the top (see, for example, FIG. 4A). The resist may be a liquid, viscous or soluble material whose relevant properties may be changed or altered by means of radiation. In one embodiment, a liquid resist is used that can be solidified by exposing a target volume to appropriate radiation.

Figure 2B:
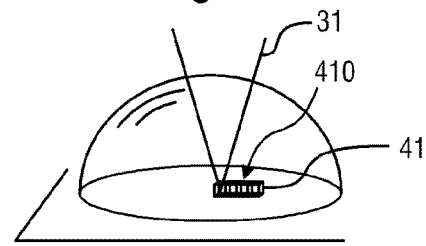

In FIG. 2B, there is shown the exposure of a voxel of a first volume to a first radiation. The finite effective volume of a focal point is adjusted so as to coincide with this first voxel volume 41 of the first resolution. Specifically, the radiation power and focal point distribution is set so as to expose the target volume with sufficient radiation 31 power during a step time so as to reliably transform the resist in this volume from the initial state—e.g. liquid, viscous or soluble state, to the final state—e.g. solid, hardened, or non-soluble state. In this embodiment the volume 41 is meant to correspond to a relatively low resolution.

After a step-wise repetition of changing the position of the resist relative to the radiation beam 31, a first part 410 of coarse elements is gradually formed. Specifically, this may involve a step-wise repetition of obscuring the radiation beam, changing the position, and exposing the new target volume with the radiation. The step-size, i.e. the travelled distance during a position change may correspond to a lateral nominal width of the voxel volume or may have some well-defined and predetermine relation thereto. For example, the step size may be chosen to be smaller than a lateral extension of the voxel volume so as to ensure a reliable continuity of the structure to be formed in the sense of an overlap.

Figure 2C:
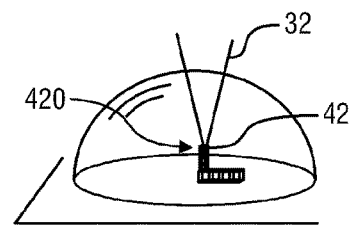

FIG. 2C shows the state after changing to a second, relatively high resolution and a step-wise repetition of changing the position of the resist relative to the radiation beam 32 by a relatively small step-size. In this way, relatively small volumes 42 are gradually added and a second part 420 of the target structure is formed that comprises a higher resolution, finer granularity and higher feature richness.

Figure 2D:
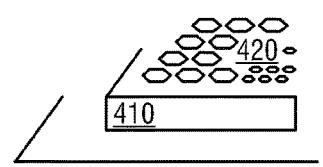

As shown in FIG. 2D, there may be obtained by the embodiments of the present invention, a target structure, such as a microchannel part, comprising a first part 410 of coarse elements, printed by means of a lower resolution, and a second part 420 of fine elements, printed by means of a higher resolution. Since the writing speed that is relative to exposed absolute volume over writing time can be substantially reduced by forming the coarse first part by means of a low resolution, the overall process time can be drastically reduced, while maintaining the fine resolution where needed (e.g. structure 420). In the shown example, one or more nano scale elements 420 may be formed by three-dimensional printing while keeping the overall process time down by printing the required, more coarse support structures 410 with a lower resolution.

Figure 3:
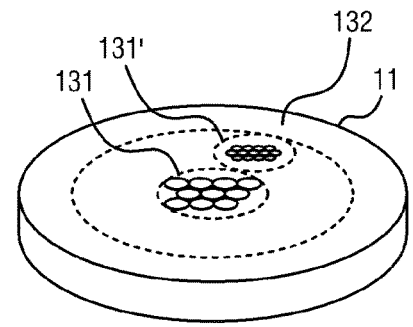
FIG. 3 shows a schematic view of microchannel plate substrate as a possible application of the embodiments of the present invention.

FIG. 3 shows a schematic view of a microchannel sensor according in a configuration considering different channel cross sections as an exemplary target structure in the sense of the embodiments of the present invention. Accordingly, a microchannel sensor for detecting radiation and/or particles is provided and comprises at least a sensor substrate 11. The sensor substrate 11 comprises a plurality of channels extending from one side of the substrate to the other and the channels are arranged along a channel axis which is tilted relative a normal axis of the substrate. Specifically, the sensor substrate 11 comprises one or more channel zones 131, 131', which may comprise sets of channels with different cross sections. This embodiment also shows a support part 132 that surrounds, generally at least in part, the one or more channel zones 131, 131'.

The support part 132 can be provided for facilitating handling and mounting of a sensor substrate according to an embodiment of the present invention during operation. For example, a support part can be provided for handling, touching and fixing during operation. As the support part 132 usually comprises less complex features and does usually not require a high resolution during manufacturing, it can be manufactured using a relatively low resolution, while the one or more channel zones 131, 131' can be manufactured using a relatively high resolution as this is particularly described in greater detail in conjunction with the manufacturing embodiments.

FIGS. 4A and 4B show schematic views of general device and apparatus embodiments of the present invention. FIG. 4A shows schematically the configuration of a bottom-up type three-dimensional nano printer. In such a configuration, an amount of resist 20 resides under a support 60. This support 60 may be mounted on a high-resolution drive mechanism 52, such as a piezo or galvo drive. This mechanism may be controlled by respective driving controller 520. The high-resolution drive mechanism 520 may in turn be mounted on a low-resolution mechanism 51, such as a piezo or step-motor drive being controlled by a respective driving controller 510. In this way, the resist 20 can be positioned relative to a beam 30 relatively fast by means of the low resolution mechanism 51 providing a relatively large step size per iteration, and, relatively slow by means of the high resolution mechanism 52 providing a relatively small step size per iteration. By means of appropriate control of the driving controllers 510 and 520 there may be formed relatively coarse structures relatively fast, while still relatively fine structures can be obtained with an increased resolution.

The setup further comprises a radiation source 70 that focusses a radiation beam 30 at a target focal point (with the corresponding effective focal point volume) inside the resist 20. For this purpose, the radiation source may comprise one or more beam sources 71, 72, that provide, respectively, radiation at a first power—and possibly with first wavelength and spectral characteristics—during exposure with a first resolution, and radiation at a second power—and possibly with second wavelength and spectral characteristics—during exposure with a second resolution. Further, the radiation source 70 may comprise an adjustable part 73 of the beam path so as to adapt the beam 30 for the chosen resolution in addition to, or instead of the plurality of beam sources 71, 72.

The shown elements can be controlled by a common controller 8 as shown schematically in FIG. 4B. This controller 8 may comprise a processing unit 81, a memory unit 82, and an interface 83. The memory unit 82 may store code that instructs the processing unit 81 during operation so as to implement a method embodiment of the present invention. Specifically, the memory unit may comprise code that implements, by means of control by the processing unit and via the interface 83 the steps setting a step size to a first resolution, setting a voxel volume to a first volume, exposing a first set of voxels of said first volume to radiation using said first resolution, setting the step size to a second resolution being smaller than said first resolution, or, respectively, greater than said first resolution, setting the voxel volume to a second volume being smaller than said first volume, or, respectively, greater than said first volume, and exposing a second set of voxels of said second volume to radiation using said second resolution. For this, the interface 83 may generate and exchange instruction commands or signals with any one of the driving controllers 510 and 520, the radiation source 70, the beam sources 71, 72, and/or the adjustable part 73 as shown in FIG. 4A.

FIGS. 5A and 5B show a schematic view of writing path arrangement according to an embodiment of the present invention. In the embodiment shown in conjunction with FIG. 11A, the writing path is adjusted starting over the whole MCP from the inside to the outside with the elements of the relatively high resolution in the center and then form the elements with the relatively low resolution in an area at least in part surrounding said center. As shown in FIG. 11B, several elements or voxels for nanometer- to micrometer-sized channels in segments over the whole MCP. In general, also alignment marks can be provided for assisting the stitching-free formation of the target structure and/or assisting and supporting a change of resolution.

Although detailed embodiments have been described, these only serve to provide a better understanding of the invention defined by the independent claims and are not to be seen as limiting.

The invention claimed is:

1. A method of step-wise exposing a voxel of a resist to radiation for forming a three-dimensional structure, the method comprising:
   setting a step size to a first resolution;
   setting a voxel volume to a first volume;
   exposing a first set of voxels of said first volume to radiation using said first resolution;
   setting the step size to a second resolution being smaller than said first resolution, or, respectively, greater than said first resolution;
   setting the voxel volume to a second volume being smaller than said first volume, or, respectively, greater than said first volume;
   exposing a second set of voxels of said second volume to radiation using said second resolution; and
   manufacturing of a sensor substrate for a microchannel sensor,
   wherein in said sensor substrate one or more channel zones and a support part are formed, wherein one or more channel zones are formed by at least exposing a first set of voxels of said first volume using said first resolution and said support part is formed by at least exposing a second set of voxels of said second volume using said second resolution, said second volume being greater than said first volume.

2. The method of claim 1, further comprising setting a radiation power to a first power before exposing the first set of voxels, and setting the radiation power to a second power before exposing the second set of voxels, said first power being smaller than said second power if the first volume is smaller than the first volume, and greater than said second power if the first volume is greater than the first volume.

3. The method of claim 1, further comprising changing an optical path of said radiation between exposing the first set of voxels and exposing the second set of voxels.

4. The method of claim 3, wherein changing said optical path comprises inserting or removing of an optical component.

5. The method of claim 1, wherein the first step size of said first resolution is in a range of 100 nm to 300 nm, and the first volume of said voxel volume is in a range of 10,000 nm3 to 2.7×107 nm3.

6. The method of claim 5, wherein exposing said first set of voxels comprises driving any one of a piezo drive and a galvo drive.

7. The method of claim 1, wherein the second step size of said second resolution is in a range of 500 nm to 5 μm, and the second volume of said voxel volume is in a range of 0.125 μm3 to 125 μm3.

8. The method of claim 7, wherein exposing said second set of voxels comprises driving any one of a piezo drive and a step motor drive.

9. The method according claim 1, wherein the sensor substrate in said one or more channel zones comprises a relatively high feature density, and in said support part a relatively low feature density.

10. The method according to claim 1, wherein a diameter of at least a hollow channel part of a cross section in said one or more channel zones is less than 20 micrometers.

11. The method according to claim 10, wherein the diameter is less than 10 micrometers.

12. The method according to claim 10, wherein the diameter is less than 100 nanometers.

* * * * *